(12) United States Patent
Hildinger

(10) Patent No.: US 11,336,157 B2
(45) Date of Patent: May 17, 2022

(54) ASSEMBLY FOR ELECTRICALLY EXCITING THE ROTOR OF AN ELECTRICAL MACHINE, AND METHOD FOR OPERATION

(71) Applicant: VOITH PATENT GMBH, Heidenheim (DE)

(72) Inventor: Thomas Hildinger, Santana (BR)

(73) Assignee: Voith Patent GmbH, Heidenheim (DE)

( * ) Notice: Subject to any disclaimer, the term of this patent is extended or adjusted under 35 U.S.C. 154(b) by 130 days.

(21) Appl. No.: 16/956,698

(22) PCT Filed: Oct. 26, 2018

(86) PCT No.: PCT/EP2018/079387
§ 371 (c)(1),
(2) Date: Jun. 22, 2020

(87) PCT Pub. No.: WO2019/120707
PCT Pub. Date: Jun. 27, 2019

(65) Prior Publication Data
US 2021/0367487 A1  Nov. 25, 2021

(30) Foreign Application Priority Data

Dec. 22, 2017 (DE) .......................... 102017131050

(51) Int. Cl.
*H01R 39/46* (2006.01)
*H02K 13/14* (2006.01)
*H02K 13/02* (2006.01)
*H02K 19/32* (2006.01)

(52) U.S. Cl.
CPC ............. *H02K 13/14* (2013.01); *H01R 39/46* (2013.01); *H02K 13/02* (2013.01); *H02K 19/32* (2013.01)

(58) Field of Classification Search
CPC ........ H01R 39/46; H01R 39/54; H02K 13/02; H02K 13/14; H02K 19/32; H02K 23/66; H02K 27/28
See application file for complete search history.

(56) References Cited

U.S. PATENT DOCUMENTS

| 7,545,073 | B2 | 6/2009 | Lewis et al. |
| 9,847,640 | B2 | 12/2017 | Day |
| 10,498,279 | B2 * | 12/2019 | Ouyang ................. H02K 19/28 |
| 2005/0280329 | A1 | 12/2005 | Day et al. |
| 2008/0309296 | A1 | 12/2008 | Nelson |
| 2017/0214202 | A1 | 7/2017 | Holzapfel et al. |

FOREIGN PATENT DOCUMENTS

| CN | 106797099 A | 5/2017 |
| DE | 929800 C | 7/1955 |
| DE | 19737578 A1 | 3/1999 |

(Continued)

*Primary Examiner* — Burton S Mullins
(74) *Attorney, Agent, or Firm* — Laurence A. Greenberg; Werner H. Stemer; Ralph E. Locher

(57) ABSTRACT

In an assembly for electrically exciting the rotor of an electrical machine, the wear of the sliding contacts is reduced in operating conditions with low current density in that an AC current is injected. The additional injection of the AC current is superimposed upon the DC current. The rotor poles function as an open circuit with respect to the AC current through a co-rotating capacitor.

2 Claims, 3 Drawing Sheets

(56) References Cited

FOREIGN PATENT DOCUMENTS

| | | |
|---|---|---|
| DE | 102006040262 B3 | 4/2008 |
| DE | 102012206863 A1 | 10/2013 |
| DE | 102015111394 A1 | 2/2016 |
| EP | 1885034 A1 | 2/2008 |
| JP | 2002191157 A | 7/2002 |

* cited by examiner

US 11,336,157 B2

ASSEMBLY FOR ELECTRICALLY EXCITING THE ROTOR OF AN ELECTRICAL MACHINE, AND METHOD FOR OPERATION

BACKGROUND OF THE INVENTION

Field of the Invention

The present invention relates to an assembly for electrically exciting the rotor of an electrical machine, and to a method for operating such an electrical machine. The present invention relates to electrical machines which are excited by means of direct current.

In many electrical machines, electrical excitation of the rotor is executed by means of sliding contacts. The sliding contacts can be, for example, carbon brushes, which are applied to sliprings. By means of the sliding contacts thus constituted, the current required for the operation of the electrical machine is injected into the rotor.

During the operation of the electrical machine, the sliding contact elements undergo a varying degree of wear. If one or more of the sliding contact elements are worn, a servicing operation will be required, which is associated with costly downtimes. In order to prevent any failure of the electrical machine on these grounds for as long as possible, various measures have been proposed in the prior art. For exemplary purposes, reference may be made to DE 10 2006 040 262 B3 and EP 1 885 034 A1.

One potential reason for the increased wear of contact elements is the overshoot of a specific current density value in said contact elements (c.f. e.g. DE 10 2006 040 262 B3). However, the inventors have observed that an increased wear of contact elements can occur, even if the current density in the contact elements undershoots a specific value. With effect from a specific current density, the current flux in known and commonly employed carbon brushes results in a lubricating effect, which reduces friction. The contact elements, for example of a synchronous machine, are generally designed such that, at the nominal load, wear is as low as possible, i.e. at the nominal load, current density in the contact elements lies within a range which is favorable with respect to wear. However, specific operating conditions exist under which direct current-excited electrical machines are operated with low current densities in the contact elements over a prolonged period. These include e.g. the operation of a synchronous machine in a phase modifier mode (c.f. for example DE 10 2015 111 394 A1). Depending upon the reactive power take-up required, a synchronous machine of this type can operate in either an under-excited or an over-excited mode.

SUMMARY OF THE INVENTION

The inventor has addressed the object of reducing the wear of contact elements in direct current-excited electrical machines, when the current density in said contact elements deviates from the favorable range, in the direction of low current densities. According to the solution according to the invention, the wear of sliding contacts under operating conditions with a low current density in the sliding contacts is reduced by the additional injection of an alternating current, which is superimposed on the direct current, wherein the rotor poles, by the action of a co-rotating capacitor, act as an open circuit with respect to the alternating current, i.e. the alternating current does not flow through the rotor poles. It could also be said that the rotor poles are short-circuited by the capacitor with respect to the alternating current.

The object thus defined is fulfilled by an assembly as claimed. The object thus defined is further fulfilled by a method for operating an assembly of this type, as claimed.

BRIEF DESCRIPTION OF THE SEVERAL VIEWS OF THE DRAWING

The solution according to the invention is described hereinafter with reference to the figures. In the figures, specifically.

DETAILED DESCRIPTION OF THE INVENTION

Figure 1:
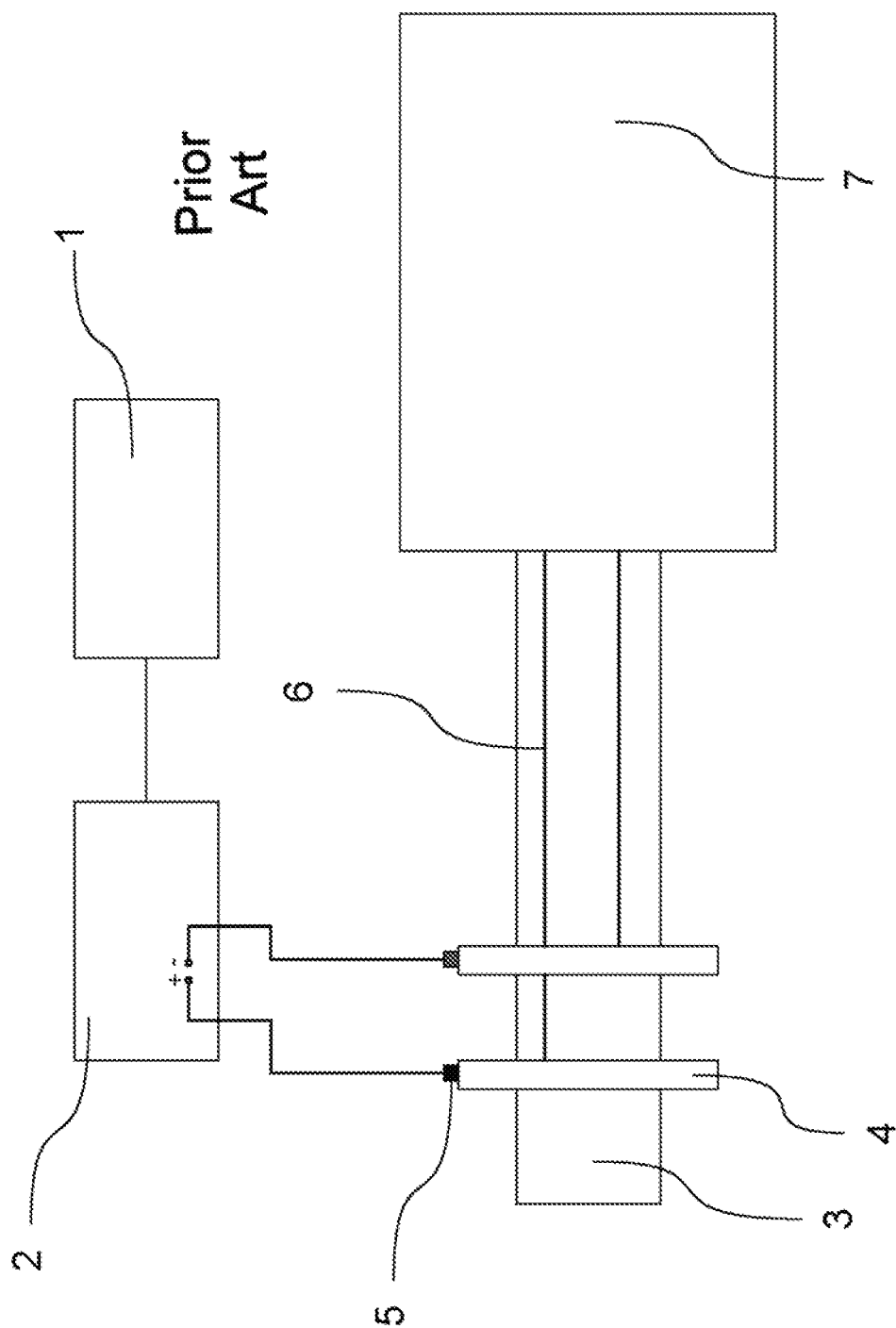
FIG. 1 represents an assembly for electrically exciting the rotor of an electrical machine, according to the prior art.

FIG. 1 shows a highly schematic representation of an assembly for electrically exciting the rotor of an electrical machine with direct current, according to the prior art. The rotor comprises a rotor body, which is identified by the number 7, and which incorporates the electrical rotor poles. The rotor further comprises a shaft, which is identified by the number 3 and which carries the sliprings, one of which is identified by the number 4. For the electric power supply of the rotor poles, the assembly comprises a voltage source, which is identified by the number 2 and which delivers a DC voltage. The assembly further comprises contact elements for the contact-connection of the sliprings, one of which is identified by the number 5. On the shaft 3, electrical conductors are provided which connect the sliprings 4 to the rotor poles, one of which is identified by the number 6. The voltage source 2 is connected to the contact elements 5. The voltage source 2, the electrical connection with the contact elements 5 and the conductors 6 are arranged on the shaft such that a direct current can flow through an excitation current circuit thus constituted, in order to excite the rotor poles. The electrical machine further comprises a controller, which is identified by the number 1, and is configured and connected to the voltage source 2 such that it can control the latter. It is clear that at least two sliprings (4) and two contact elements (5) are required.

Figure 2:
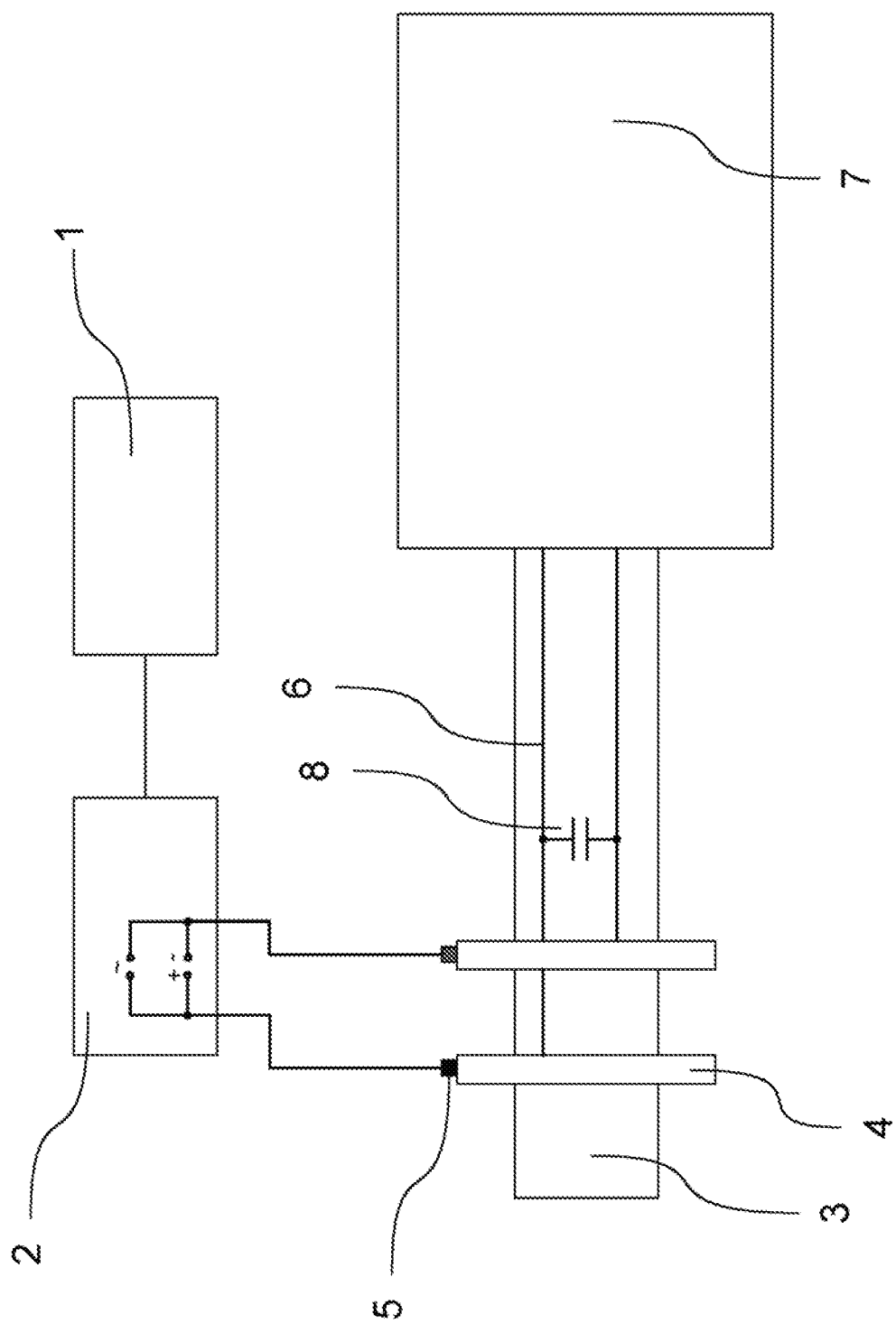
FIG. 2 represents an assembly according to the invention for electrically exciting the rotor of an electrical machine.

FIG. 2 shows a highly schematic representation of an assembly for electrically exciting the rotor of an electrical machine, according to the invention. The reference numbers according to FIG. 2 correspond to the reference numbers according to FIG. 1. By way of distinction from FIG. 1, the voltage source 2 according to FIG. 2 can deliver a voltage which comprises both a DC voltage component and an AC voltage component. The two components are superimposed. This is indicated by the parallel-connected arrangement of voltage source symbols for a DC voltage and an AC voltage. FIG. 2 provides no details of the actual configuration of the voltage source 2. In this regard, a variety of appropriate forms of embodiment will be generally familiar to a person skilled in the art. The controller 1 is configured and is connected to the voltage source 2 such that the DC and AC voltage components thereof can respectively be set in a mutually independent manner. In an equivalent manner, naturally, two separately actuatable voltage sources might also be employed, which respectively deliver the DC voltage and the AC voltage component, and are correspondingly interconnected. In the context of the invention, an assembly of this type would be understood as a voltage source 2. The rotor moreover comprises a capacitor, which is identified by the number 8, and is arranged on the current circuit arranged on the rotor which is provided for the supply of the rotor poles and configured such that it permits the rotor poles to function as an open circuit, with respect to the AC voltage component of the voltage source 2. It is thus ensured that a current can flow through the contact elements 5 which comprises a DC and an AC component, but that only a direct current flows through the rotor poles, or that the current flowing through the rotor poles incorporates an AC component which is negligibly small in comparison with the DC component. The manner in which the capacitor 8 is to be configured for this purpose by a person skilled in the art is clarified below.

Figure 3:
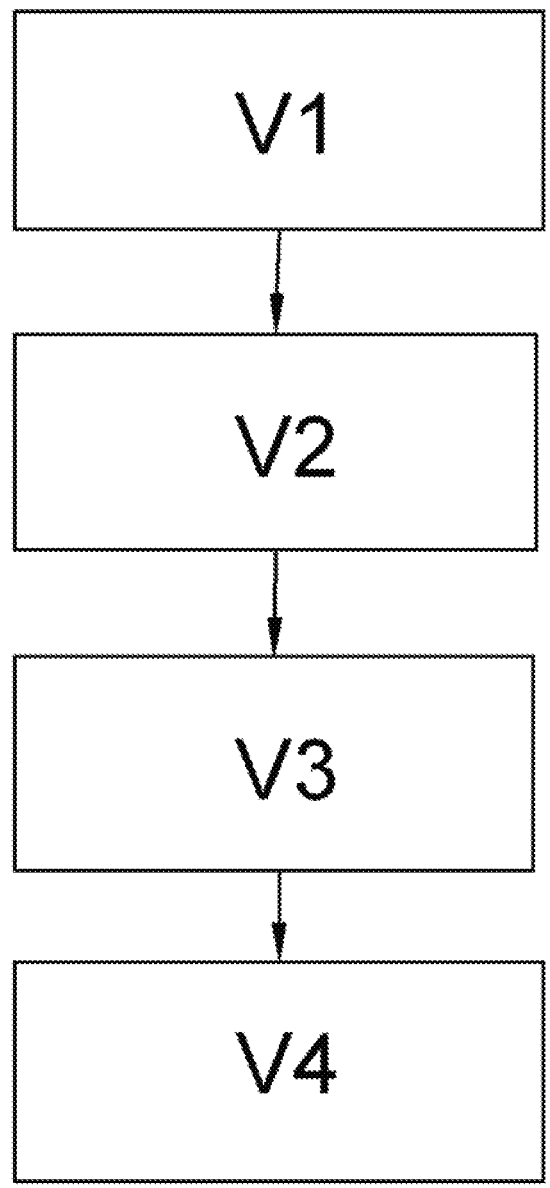
FIG. 3 represents a flow diagram for the method according to the invention.

FIG. 3 shows the flow diagram of the method according to the invention for operating an assembly according to the invention, as represented in FIG. 2. The individual process steps are identified by the symbols V1 to V4. The process steps comprise the following operations, in the sequence indicated:

V1: establishment of the operating state of the electrical machine;

V2: selection of the requisite DC voltage component;

V3: selection of the requisite AC voltage component;

V4: actuation of the voltage source 2 in accordance with the voltage components selected in V2 and V3.

In step V1, the operating state of the electrical machine is established. This can be executed by the application of an external command to the controller 1, or by means of the controller 1 itself. In step V2, the controller 1 selects the DC voltage component of the voltage source 2 required for the operating state established in V1. In step V3, the controller selects the AC voltage component of the voltage source 2. The selection in V3 is executed in accordance with the following criteria. From the DC voltage component selected in V2, the DC component of the current density flowing through the contact elements 5 is established. If the direct current density in the contact elements 5 exceeds a predefined value, no AC voltage component is required, as the DC component alone is sufficient to raise the current density in the contact elements 5 above the lower threshold of the range in which the wear of the contact elements is acceptable, i.e. in which the lubricating effect is sufficient. However, if the direct current density undershoots the above-mentioned predefined value, an AC voltage component is required for the achievement of a sufficient lubricating effect. The lubricating effect results from the heat-up of the contact elements 5 associated with the current flux in the latter. If the direct current density undershoots the predefined value, i.e. by delta_i_dc, an alternating current density with a root mean square value of at least i_ac_rms≥ delta_i_dc is required in order to permit the achievement of an acceptable lubricating effect. Clearly, the above-mentioned predefined value is dependent upon the material and the geometry of the contact elements 5 used. However, it will be sufficiently clear to a person skilled in the art how this predefined value can be established. Optionally, a person skilled in the art can also determine this value experimentally, by measuring wear in the contact elements 5 as a function of the direct current density. The value sought will then proceed from the measured wear and the desired minimum service life of the contact elements. In step V4, the controller 1 actuates the voltage source 2 in accordance with the DC and AC voltage components selected in steps V2 and V3.

The design rating of the capacitor 8 is dependent upon the frequency f of the AC voltage component of the voltage source 2 and the inductance L of the rotor poles. If the unwanted AC voltage component flowing in the rotor poles is to be negligibly small, the capacitance C of the capacitor 8 must fulfil the following condition: $(4\pi^2 \ast f^2 \ast C \ast L) \gg 1$. This condition can thus be fulfilled by a sufficiently high frequency f and/or by a sufficiently large capacitance of the capacitor 8. As the capacitor 8 co-rotates with the rotor, it is endeavored that the rating of the capacitor should not be excessively high. Secondly, in the interests of the greatest simplicity, f is selected as the network frequency, as this permits the design of the voltage source 2 to be simplified. Depending upon marginal conditions in force, a person skilled in the art, from the above, will be able to select a favorable combination of the parameters f and C in a problem-free manner.

In conclusion, it should be mentioned that the selection of the voltage components in V2 and V3 by the controller 1 can be executed by reference to a predefined table and/or on the basis of calculations.

The invention claimed is:

1. An assembly for electrically exciting an electrical machine, the electrical machine having a rotor with a rotor body, which includes at least one rotor pole, and having a shaft and at least two sliprings, the assembly comprising:
   a voltage source configured to supply a DC voltage and an AC voltage;
   a controller connected to said voltage source and configured to control the DC voltage of said voltage source;
   at least two contact elements for contact-connecting the sliprings and electrical conductors for connecting the sliprings to the at least one rotor pole of the rotor body;
   wherein said voltage source is connected to said contact elements and said electrical conductors to form an excitation current circuit for conducting a direct current for exciting the at least one rotor pole;
   said controller being configured to control the AC voltage of said voltage source independently of the DC voltage;
   said voltage source and said controller being configured to selectively superimpose the AC voltage upon the DC voltage in order to reduce wear of said contact elements under operating conditions with a low current density in said contact elements by an additional injection of an alternating current superimposed upon the direct current;
   a capacitor mounted to said rotor and forming a part of the excitation current circuit on the rotor, said capacitor enabling the at least one rotor pole to function as an open circuit, with respect to the AC voltage of said voltage source, and to prevent the alternating current from flowing through the at least one rotor pole.

2. A method for electrically exciting an electrical machine having a rotor with a rotor body formed with at least one rotor pole, having a shaft and at least two sliprings, the method comprising:
   providing an assembly for exciting the electrical machine, the assembly including:
   a voltage source for supplying a DC voltage and an AC voltage;
   a controller connected to the voltage source for controlling the DC voltage and the AC voltage of the voltage source independently of one another;

at least two contact elements for a contact-connection of the sliprings and electrical conductors for connecting the sliprings to the at least one rotor pole;

wherein the voltage source is connected to the contact elements and the electrical conductors are configured to conduct a direct current through an excitation current circuit, in order to excite the at least one rotor pole;

wherein the voltage source is configured to superimpose the AC voltage upon the DC voltage in order to reduce wear of the contact elements under operating conditions with a low current density in the contact elements by additional injection of an alternating current superimposed upon the direct current;

a capacitor connected and mounted as a part of the excitation current circuit on the rotor, wherein the capacitor permits the at least one rotor pole to function as an open circuit, with respect to the AC voltage component of the voltage source, such that the alternating current does not flow through the at least one rotor pole; and the method further comprising the following steps, to be executed in the recited sequence:

step V1: establishing an operating state of the electrical machine;

step V2: selecting a required DC voltage component;

step V3: selecting a required AC voltage component;

step V4: actuating the voltage source in accordance with the voltage components selected in steps V2 and V3;

executing steps V2 to V3 with the controller and thereby, in step V2, selecting the required DC voltage component based on an establishment of the operating state in step V1 and, in step V3, selecting the required AC voltage component according to the following criterion:

if the DC voltage component selected in V2 is not sufficient to raise the direct current density in the contact elements above a predefined value which ensures an adequate lubricating effect of the contact elements on the slip rings, selecting an AC voltage component such that a root mean square value of the alternating current density which flows in the contact elements, and which is generated by the selected AC voltage component, is at least as great as the deviation of the direct current density from the above-mentioned predefined value.

* * * * *